(12) United States Patent
Lee et al.

(10) Patent No.: US 10,095,317 B2
(45) Date of Patent: Oct. 9, 2018

(54) SYSTEM FOR HAND GESTURE DETECTION

(71) Applicant: Stichting IMEC Nederland, Eindhoven (NL)

(72) Inventors: Seulki Lee, Eindhoven (NL); Pierluigi Casale, Waalre (NL); Hendrikus Wilhelmus Johannes Van De Wiel, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 33 days.

(21) Appl. No.: 15/380,110

(22) Filed: Dec. 15, 2016

(65) Prior Publication Data

US 2017/0177092 A1 Jun. 22, 2017

(30) Foreign Application Priority Data

Dec. 18, 2015 (EP) .................................... 15201287

(51) Int. Cl.
| | |
|---|---|
| *G06F 3/01* | (2006.01) |
| *G06F 3/0346* | (2013.01) |
| *G06F 1/16* | (2006.01) |

(52) U.S. Cl.
CPC .............. *G06F 3/017* (2013.01); *G06F 3/011* (2013.01); *G06F 3/014* (2013.01); *G06F 3/015* (2013.01); *G06F 3/0346* (2013.01)

(58) Field of Classification Search
CPC ........ G06F 3/011; G06F 3/017; G06F 3/0346; G06F 3/014; G06F 1/163
See application file for complete search history.

(56) References Cited

U.S. PATENT DOCUMENTS

| | | | |
|---|---|---|---|
| 9,427,158 B2* | 8/2016 | Choi ................... | A61B 5/6843 |
| 2004/0243342 A1 | 12/2004 | Rekimoto | |
| 2008/0072691 A1 | 3/2008 | Gruber | |
| 2011/0309908 A1* | 12/2011 | Ando ................... | G06F 3/0338 338/47 |
| 2013/0232095 A1 | 9/2013 | Tan et al. | |
| 2014/0198034 A1 | 7/2014 | Bailey et al. | |

(Continued)

OTHER PUBLICATIONS

European Search Report, European Patent Application No. 15201287.8, dated Jun. 15, 2016, 7 pages.

(Continued)

*Primary Examiner* — Larry Lee
(74) *Attorney, Agent, or Firm* — McDonnell Boehnen Hulbert & Berghoff LLP

(57) ABSTRACT

A system for hand gesture detection is provided, comprising: a wrist wear adapted to be worn about a wrist of a user of the system and including a set of skin electrodes adapted to face the wrist; an impedance measurement circuit adapted to measure at least a first impedance in a first portion of the wrist and a second impedance in a second portion of the wrist which second portion is circumferentially displaced in relation to said first portion, wherein the first impedance is measured via a first electrode group including four skin electrodes of said set of skin electrodes and the second impedance is measured via a second electrode group including four skin electrodes of said set of skin electrodes, and a processing circuit adapted to detect a hand gesture of the user based on the first and the second impedance measured by the impedance measurement circuit.

18 Claims, 5 Drawing Sheets

(56) References Cited

U.S. PATENT DOCUMENTS

| | | | |
|---|---|---|---|
| 2015/0272482 A1 | 10/2015 | Houmanfar et al. | |
| 2015/0346833 A1* | 12/2015 | Jiang | G06F 3/017 345/158 |
| 2016/0058133 A1* | 3/2016 | Fournier | H04B 1/3888 455/41.2 |

OTHER PUBLICATIONS

Zheng, Enhao et al., "A Wearable Capacitive Sensing System With Phase-Dependent Classifier for Locomotion Mode Recognition", The Fourth IEEE RAS/EMBS International Conference on Biomedical Robotics and Biomechatronics, Roma, Italy, Jun. 24-27, 2012, pp. 1747-1752.

Rekimoto, Jun, "GestureWrist and GesturePad: Unobtrusive Wearable Interaction Devices", Proceedings of the 5th IEEE International Symposium on Wearable Computers, Feb. 2001, 7 pages.

\* cited by examiner

SYSTEM FOR HAND GESTURE DETECTION

CROSS-REFERENCE TO RELATED APPLICATIONS

The present application is a non-provisional patent application claiming priority to European Patent Application No. EP 15201287.8, filed Dec. 18, 2015, the contents of which are hereby incorporated by reference.

FIELD OF THE DISCLOSURE

The present disclosure relates to a system for hand gesture detection.

BACKGROUND

Owing to the rapid technological development of the semiconductor and software industry, computing devices are now ubiquitous and come in various form factors. Whereas early computers generally were stationary devices which allowed a user to interact with a text-based or graphical user interface mainly via a pointing device, such as a computer mouse, and/or a computer keyboard, modern computing devices are frequently portable devices such as smart phones, tablet computers, hybrids of laptops and tablet computers, etc., and allow user input via a touchscreen. Other modern types of computing devices include TVs with internet access, digital content streaming devices, gaming consoles etc.

A common denominator of the aforementioned user input interfaces is that they generally require the user to make physical contact with the input device using the hand or fingers (e.g. buttons of a keyboard, moving a computer mouse, the surface of a touchscreen, buttons of a remote control or a game controller). As an alternative, input devices allowing a user to control an input operation by making a gesture with the hand have been proposed. For such input devices to become usable and popular they would however need to be reliable in terms of detection and be comfortable to wear. A relatively inconspicuous appearance would also be beneficial. US 2004/0243342 discloses a user input apparatus in the shape of a wrist watch or bracelet and suggests that gestures may be detected by electrically sensing a change of the shape of the wrist.

SUMMARY

The present disclosure relates to hand gesture detection. An objective of some embodiments of the present disclosure is to provide a system for hand gesture detection which enables hand gesture detection with an improved sensitivity and/or reliability. Further objects and aspects may be understood from the following.

According to an aspect of the present disclosure there is provided a system for hand gesture detection, comprising: a wrist wear adapted to be worn about a wrist of a user of the system and including a set of skin electrodes; an impedance measurement circuit adapted to measure at least a first impedance in a first portion of the wrist and a second impedance in a second portion of the wrist which second portion is circumferentially displaced in relation to the first portion, wherein the first impedance is measured via a first electrode group including four skin electrodes of the set of skin electrodes and the second impedance is measured via a second electrode group including four skin electrodes of the set of skin electrodes, and a processing circuit adapted to detect a hand gesture of the user based on the first and the second impedance measured by the impedance measurement circuit.

Some embodiments implement, what may be referred to as, a tetra-polar impedance measurement wherein each impedance measurement is performed via four electrodes. The impedance measurements may therefore accurately reflect the body impedance in the first and the second portion of the wrist, respectively, while being relatively insensitive to the influence of contact impedance at the skin electrode-interface which otherwise would tend to overwhelm the contribution from a body impedance inside the wrist.

The gesture of the human hand is controlled inter alia via a plurality of tendons extending through the wrist. As a tendon is stretched or contracted the impedance in a wrist portion including or adjacent to the tendon will change. The high sensitivity of the impedance measurement circuit enables the impedance change due to stretching/contraction of a tendon to be detected. The impedance change will be greater in a wrist portion which is closest to the stretching/contracting tendon. Measuring the impedance in two circumferentially displaced portions thus enables detection of different hand gestures (e.g. did a finger controlled by a tendon which is closest to the first portion or the second portion stretch/contract). In particular, the system enables detection of hand gestures involving movement of one or more fingers of the hand and discrimination between movement of different fingers.

"Circumferentially displaced" may in this context refer to a circumferential direction of the wrist wear or a circumferential direction of the wrist of the user, i.e. when the wrist wear is worn about the wrist of the user.

In some embodiments, the system enables detection of hand gestures of various forms and complexity. As a basic example, detection of a hand gesture may involve detecting movement of one or more fingers of the hand. The movement may include bending or straightening one or more fingers. As a further example, detection of a hand gesture may involve detecting a particular movement of particular ones of the fingers, the detection hence being able to discriminate between different degrees of movement of the fingers and between movements of different fingers or different combinations of fingers.

According to one embodiment the first electrode group and the second electrode group have at least one electrode in common. This makes it possible to reuse electrodes in different impedance measurements and hence improve the spatial resolution of the impedance measurements, or conversely reduce the total required number of electrode pairs while maintaining the number of portions to be measured. According to an alternative embodiment each one of the four electrodes of the first electrode group may be different from each one of the four electrodes of the second electrode group. This may provide an increased freedom in terms of the relative positioning of the electrode groups.

According to one embodiment a first and a second electrode of the first electrode group are arranged on opposite sides of a geometrical line extending between a third and a fourth electrode of the first electrode group. Additionally, a first and a second electrode of the second electrode group are arranged on opposite sides of a geometrical line extending between a third and a fourth electrode of the second electrode group. This pattern formed by the four electrodes of each electrode group enables a voltage sensing path (e.g. between the third and the fourth electrodes) to be formed across a current transmission path (e.g. between the first and the second electrodes) during an impedance measurement. A representative body impedance measurement may thereby be obtained for the first and the second portion of the wrist.

According to one embodiment the first electrode group and the second electrode group have at least one electrode in common and wherein the at least one common electrode is arranged between the other electrodes of the first electrode group and the other electrodes of the second electrode group, as viewed along a circumferential direction of the wrist wear. This arrangement enables electrode reuse between the electrode groups. In particular, the reuse is enabled in combination with the above-discussed crossing of the voltage sensing and current transmission path.

According to one embodiment the second electrode of the first electrode group forms the fourth electrode of the second electrode group and the third electrode of the first electrode group forms the first electrode of the second electrode group, wherein the second and the third electrode of the first electrode group are arranged between the first and the fourth electrode of the first electrode group and the third and the second electrode of the second electrode group, as viewed along a circumferential direction of the wrist wear. This arrangement enables two electrodes to be shared between the electrode groups. In particular, the reuse is enabled in combination with the above-discussed crossing of the voltage sensing and current transmission path.

According to one embodiment the first and the third electrode of the first electrode group and the second electrode group are arranged along a first common geometrical line and wherein the fourth and the second electrode of the first electrode group and the second electrode group are arranged along a second common geometrical line. This may improve the uniformity between the electrode groups and enable a rational manufacture of the wrist wear and the set of electrodes. The first common geometrical line may be parallel to the second common geometrical line. Thereby a same inter-electrode distance may be obtained for the electrode groups. The first and the second common geometrical line may be parallel to a circumferential direction of the wrist wear. The first and the second electrode groups may thereby be arranged at corresponding longitudinal positions along a (same or respective) tendon (i.e. at a substantially same distance from a base of the hand).

According to one embodiment the fourth electrode of the first electrode group forms the third electrode of the second electrode group, the fourth electrode of the first electrode group being arranged between the first, second and third electrodes of the first electrode group and the first, second and fourth electrodes of the second electrode group, as viewed along a circumferential direction of the wrist wear. This arrangement enables one electrode to be shared between the electrode groups. In particular, the reuse is enabled in combination with the above-discussed crossing of the voltage sensing and current transmission path.

According to one embodiment the first and the second electrode group are circumferentially displaced in relation to each other and wherein, for each one of the first and the second electrode group, a first, a second, a third and a fourth electrode of the electrode group are arranged along a common geometrical line, the third and the fourth electrode being arranged between the first and the second electrode. Each electrode group may hence form a column of four electrodes. This pattern formed by the four electrodes of each electrode group enables a voltage sensing path (e.g. between the third and the fourth electrodes) to extend along and be aligned with a current transmission path (e.g. between the first and the second electrodes) during an impedance measurement. A representative body impedance measurement may thereby be obtained for the first and the second portion of the wrist. By controlling the angle of the common geometrical line of an electrode group with respect to a width direction of the wrist wear at the manufacturing stage (e.g. such that the common geometrical is parallel or close to parallel to the width direction of the wrist wear) the impedance measurements may be performed along a longitudinally extended section of a tendon.

According to one embodiment a first and a second electrode of the first electrode group forms a first electrode pair of the first electrode group, a third and a fourth electrode of the first electrode group forms a second electrode pair of the first electrode group, a first and a second electrode of the second electrode group forms a first electrode pair of the second electrode group, a third and a fourth electrode of the second electrode group forms a second electrode pair of the second electrode group, and wherein the impedance measurement circuit is adapted to: (i) measure the first impedance, wherein measuring the first impedance includes transmitting a test current between the first or the second electrode pair of the first electrode group and measuring a voltage between the other one of the first or the second electrode pair of the first electrode group, and (ii) measure the second impedance, wherein measuring the second impedance includes transmitting a test current between the first or the second electrode pair of the second electrode group and measuring a voltage between the other one of the first or the second electrode pair of the second electrode group.

This represents one embodiment for determining the impedance in the respective wrist portions.

According to one embodiment the first electrode group and the second electrode group have two electrodes in common, wherein the second electrode of the first electrode group forms the fourth electrode of the second electrode group and the third electrode of the first electrode group forms the first electrode of the second electrode group and wherein the measurement circuit is adapted to transmit the first test current between the first electrode pair of the first electrode group and measure the first voltage between the second electrode pair of the first electrode group, and to transmit the second test current between the second electrode pair of the second electrode group and measure the second voltage between the first electrode pair of the second electrode group. This embodiment combines an example manner of determining the impedance with reuse of two electrodes between the first and the second electrode group. In particular, the third electrode is used for the voltage measurement in both the first and the second impedance measurements. Conversely, the second electrode is used for test current transmission in both the first and the second impedance measurements. This may reduce the complexity of electronics controlling which electrodes are used in each measurement. Moreover, the electrodes may be designed in a manner which is optimized for the intended function, i.e. for "current transmission" or "voltage sensing". For instance, "current transmission" electrodes may be designed to minimize contact impedance and/or "voltage sensing electrodes" may be designed for improved specificity (e.g. by presenting a relatively small surface area).

According to one embodiment the set of electrodes includes at least three electrode groups circumferentially displaced in relation to each other and each including four electrodes, in one example at least four electrode groups circumferentially displaced in relation to each other and each including four electrodes, or in other examples at least five electrode groups circumferentially displaced in relation to each other and each including four electrodes. Generally, the use of a greater number of electrode groups improves the ability to differentiate between stretching and/or contraction of different tendons. In particular, five impedance measurements provide a one-to-one relationship between the number of fingers and the number of measurements.

According to one embodiment the electrodes of the set of skin electrodes are distributed in relation to each other along a circumferential section of the wrist wear which is adapted to face an under side of the wrist. The electrode groups may thereby be arranged in relative proximity to tendons in the wrist.

According to one embodiment the system includes a switching circuit adapted to selectively connect the measurement circuit to the first electrode group or the second electrode group. An impedance measurement may thereby be selectively performed via either the first electrode group or the second electrode group.

According to one embodiment the switching circuit is adapted to connect the measurement circuit to the first electrode group during a first time interval and connect the measurement circuit to the second electrode group during a second time interval, which is different from the first time interval. Impedance measurements may thereby be performed in a "time-division" manner. The risk of other electrode groups affecting the results of an impedance measurement via a selected electrode group may thereby be reduced. In some embodiments, the first time interval and the second time interval are non-overlapping time intervals. Hence, during each impedance measurement the measurement circuit may be galvanically connected to only one electrode group (e.g. the first electrode group for the first impedance measurement and the second electrode group for the second impedance measurement), as controlled by the switching circuit.

According to one embodiment the processing circuit is adapted to detect a hand gesture by detecting a changed impedance in the first or the second portion of the wrist based on the first and the second impedance, respectively. A hand gesture may hence be detected by the processing circuit in response to at least one of the first and second impedance changing.

According to one embodiment the impedance measurement circuit is adapted to measure an impedance in each one of a plurality of circumferentially displaced portions of the wrist via a respective electrode group including four skin electrodes, and wherein the processing circuit is adapted to detect and classify the hand gesture based on the impedance measured in each one of the plurality of circumferentially displaced portions. An impedance in a plurality of different portions of the wrist may thus be used for detecting the hand gesture. By also classifying the hand gesture, more elaborate hand gesture detection is provided. The above description and discussion of variations and related aspects of the first and the second electrode group is applicable to each one of the respective electrode group.

BRIEF DESCRIPTION OF THE FIGURES

The above, as well as additional objects, features and aspects of the present disclosure, will be better understood through the following illustrative and non-limiting detailed description of example embodiments, with reference to the appended drawings. In the drawings like reference numerals will be used for like elements unless stated otherwise.

DETAILED DESCRIPTION

Figure 1:
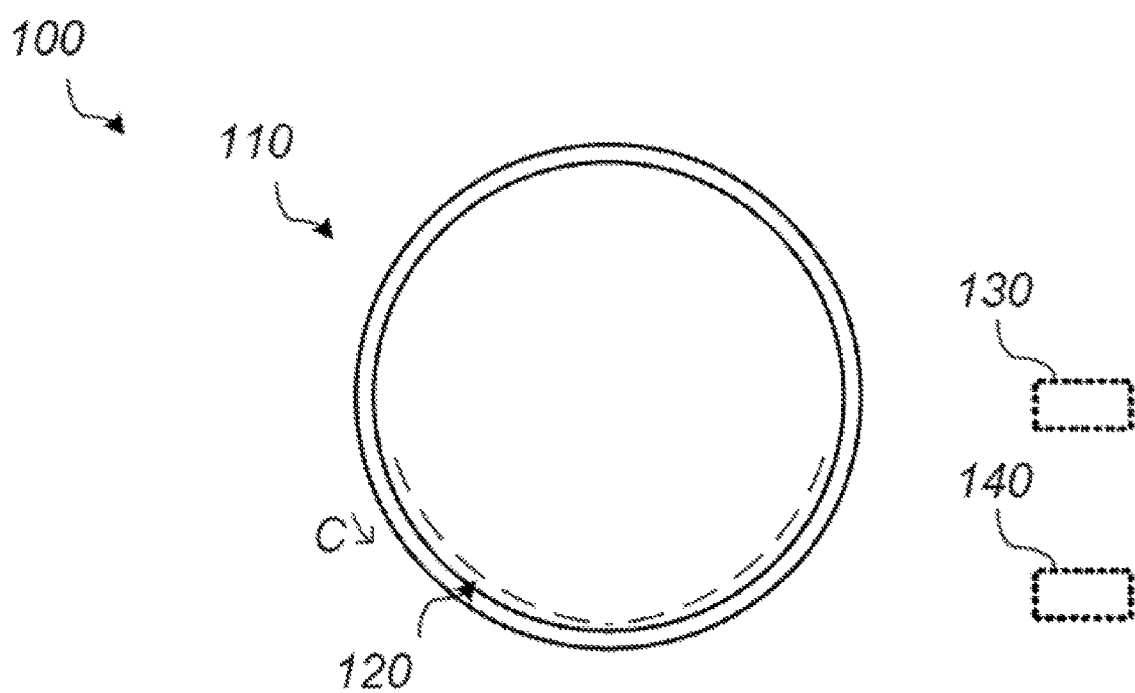
FIG. 1 is a schematic illustration of a system for hand gesture detection including a side view of a wrist wear according to an example embodiment.

FIG. 1 illustrates a system 100 for hand gesture detection. The system 100 includes a wrist wear 110 in the form of a bracelet. The wrist wear 110 is adapted to be worn about a wrist of the user of the system 100. The circumferential extension of the wrist wear 110 defines a circumferential direction "C" of the wrist wear 110 (i.e. corresponding to a direction about the wrist of the user when worn by the user) and the width extension defines a width direction of the wrist wear 110 (i.e. corresponding to a direction from the wrist towards the hand of the user when worn by the user).

The wrist wear 110 may include a strap forming a loop adapted to be arranged about the wrist of the user. Although the wrist wear 110 is illustrated as having a substantially circular shape, in practice the wrist wear 110 may have a shape which corresponds more closely with a peripheral cross-sectional shape of the wrist. Generally, the strap may be preformed to make a tight fit about the wrist when worn. The strap may include a flexible material, such as a woven material, a textile, a rubber or silicone material. The strap may alternatively include a (more) rigid material. The strap may for example include leather or a plastic material. Although shown as a closed loop, it is also possible to provide the wrist wear in the form of an open loop with a gap formed between opposite end portions of the strap. In this case the wrist wear 110 may be formed of a more rigid material.

The wrist wear 110 may be a dedicated for use in a system for hand gesture detection. Alternatively, the wrist wear 110 may form a bracelet of a wristwatch or a piece of jewelry.

The wrist wear 110 is provided with a set of a plurality of skin electrodes 120. As schematically indicated in FIG. 1, the electrodes of the set of skin electrodes 120 are distributed along a circumferential section (indicated by the dashed line) of the wrist wear 110 which in use of the wrist wear 110 is adapted to face an under side of the wrist (i.e. the palm-side). Although not shown in FIG. 1, the set of skin electrodes may be distributed along an extended circumferential section which in use of the wrist wear 110 is adapted to face both an under side and an upper side of the wrist (i.e. both the palm-side and the back-side of the hand).

Each skin electrode of the set of skin electrodes 120 is arranged on a surface of the wrist wear 110 which is intended to face the skin of the wrist, i.e. on a surface of the wrist wear 110 which faces in a radially inward direction of the wrist wear 110. Each skin electrode of the set 120 is adapted to make galvanic contact with a respective portion of the skin of the wrist. Different layouts of the set of skin electrodes 120 will be further detailed below.

Each skin electrode of the set 120 may include a separate conductive portion. Each conductive portion may include a conductive material such as stainless steel, copper, aluminum, gold, silver, silver-chloride or carbon, to name a few.

The conductive material may be arranged as a thin layer on the surface of the wrist wear 110. A thin layer may for instance be glued to the surface of the wrist wear 110, or attached by mechanical attachment means. According to further options a conductive portion may be formed by a patch of conductive ink deposited on the surface of wrist wear 110, or by a conductive yarn incorporated into the surface of the wrist wear 110 (e.g. interwoven with a strap of a woven material).

The system 100 further includes an impedance measurement circuit 130. The impedance measurement circuit 130 is connected to the set of skin electrodes 120. The impedance measurement circuit 130 is adapted to measure a respective impedance at each one of a plurality of circumferentially displaced portions of the wrist via a respective group of electrodes of the set of skin electrodes 120. Accordingly, the electrode groups are circumferentially displaced in relation to each other. Each electrode group of the set of skin electrodes 120 may be referred to as an impedance measurement channel of the system 100. The number of electrode groups/impedance measurement channels is an implementation choice and may be at least two, at least three, at least four or at least five.

The wrist includes nine tendons which extend in a respective length direction through the wrist to the hand. A movement of a finger of the hand is controlled by a respective pair of tendons. Due to the relative circumferential displacement of the electrode groups of the set of electrodes 120, an impedance may be measured by the impedance measurement circuit 130 in a number of circumferentially displaced portions of the wrist (the number of portions corresponding to the number of electrode groups). The wrist portion which presents the shortest distance to (or overlaps) a stretching/contracting tendon (or pair of tendons) may thus present the greatest impedance change.

Generally, the amount of circumferential displacement between adjacent electrode groups of the set of electrodes 120 may be such that the separation along the circumferential direction between two outer electrode groups roughly corresponds to a separation between the tendon pair controlling movement of the thumb and the tendon pair controlling movement of the little finger. However, this is not a requirement and both greater and less separation may be used. In particular, in some applications it may be desirable to only detect gestures involving movement of some of the fingers of the hand, wherein the electrode groups may be arranged to enable measurement in proximity with the tendons controlling the movement of the fingers of interest.

The system 100 further includes a processing circuit 140. The processing circuit 140 is connected to the impedance measurement circuit 130. The processing circuit 140 is adapted to detect a hand gesture of the user based on the impedances measured by the impedance measurement circuit 130.

The impedance measurement circuit 130 and the processing circuit 140 may be implemented in a respective integrated circuit, application specific integrated circuit (ASIC) or field-programmable gate array (FGPA). The impedance measurement circuit 130 and the processing circuit 140 may be arranged on separate carriers or on a common carrier. The impedance measurement circuit 130 and the processing circuit 140 may even be implemented in a common integrated circuit, ASIC or FPGA.

For clarity of the illustration, FIG. 1 shows the impedance measurement circuit 130 and the processing circuit 140 as dashed boxes which are physically separated from the wrist wear 110. However, the impedance measurement circuit 130 and the processing circuit 140 may be arranged on or supported by the wrist wear 110. For instance the impedance measurement circuit 130 and the processing circuit 140 may be arranged on a (separate or common) carrier which is attached to or incorporated in the wrist wear 110. The impedance measurement circuit 130 and the processing circuit 140 may for instance be arranged in a pocket formed in the wrist wear 110, for instance in a pocket in a strap of the wrist wear 110. If the wrist wear 110 forms a bracelet for a wristwatch, at least one of the impedance measurement circuit 130 and the processing circuit 140 may be included in the watch enclosure.

In any case, the wrist wear 110 may include connection paths extending between the impedance measurement circuit 130 and the set of skin electrodes 120 (and if the impedance measurement circuit 130 and the processing circuit 140 are implemented as physically separate circuits, also between the impedance measurement circuit 130 and the processing circuit 140). The connection paths may for instance be formed by conducting wires or by conducting paths printed on a flexible substrate (such as a thin plastic foil) and may be incorporated in a strap of the wrist wear 110. The impedance measurement circuit 130 and the processing circuit 140 may be powered by a common or by a respective power source, for instance in the form of a battery, which is integrated in wrist wear 110.

Alternatively, the impedance measurement circuit 130 and the processing circuit 140 may be arranged physically separated from the wrist wear 110. The impedance measurement circuit 130 and the processing circuit 140 may for example be included in a respective or common electronics module which may be adapted to be worn on another part of the body of the user, such as the arm or at the waist, or even placed remote from the body of the user. The impedance measurement circuit 130 may in this case be connected to the set of skin electrodes 120 by electrical wires extending from the electronics module to the set of electrodes 120 at the wrist wear 110.

According to a further alternative the impedance measurement circuit 130 may be arranged on or supported by the wrist wear 110 and the processing circuit 140 may be arranged physically separated from the wrist wear 110, for instance in an electronics module as described above. The impedance measurement circuit 130 may in this case be connected to the processing circuit 140 by electrical wires extending from the electronics module to the impedance measurement circuit 130 at the wrist wear 110, or connected by wireless means such as BLUETOOTH®, BLUETOOTH® LE or WiFi.

Figure 2:
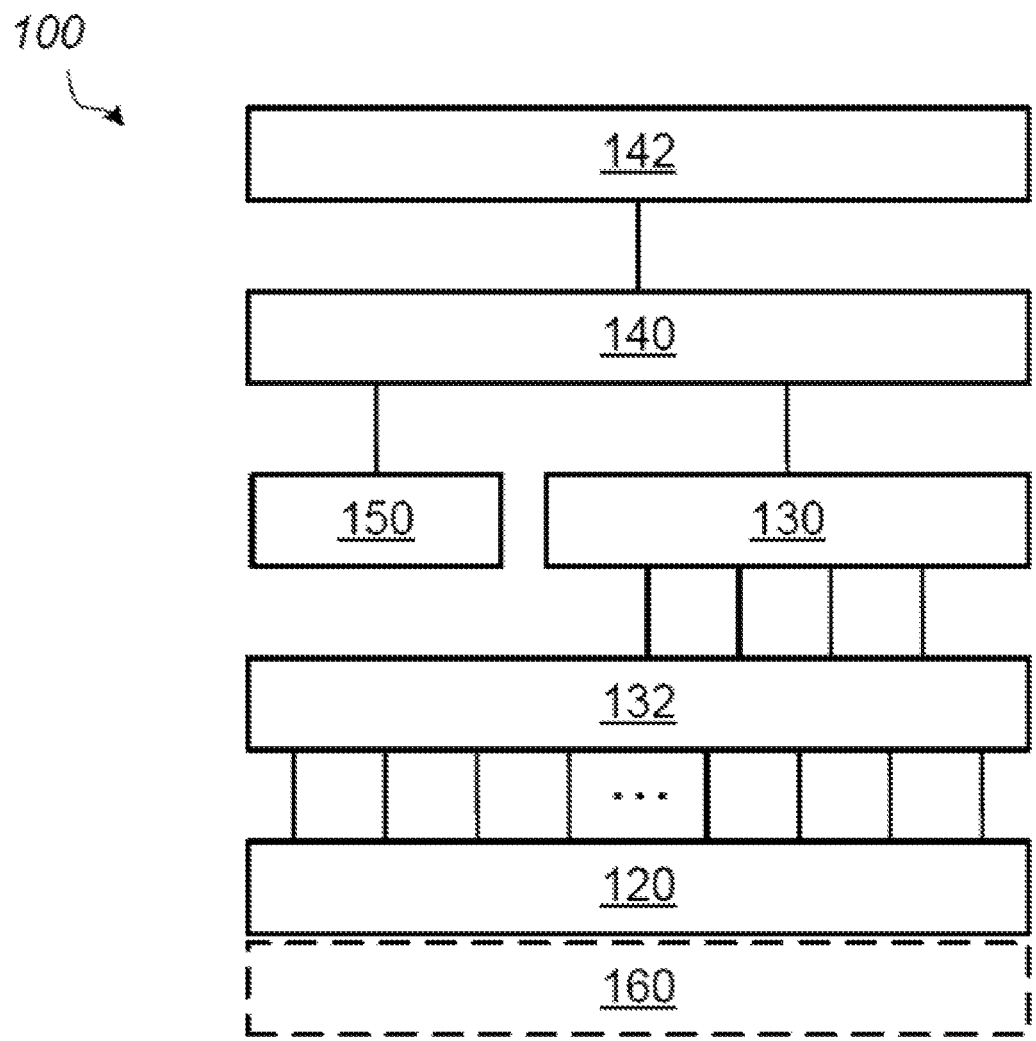
FIG. 2 is a block diagram illustration of the system for hand gesture detection according to an example embodiment.

FIG. 2 is a schematic functional block diagram of the system 100. The additional block 160 represents the wrist of the user. An indication of the wrist wear 110 has been omitted from FIG. 2 for the purpose of illustrative clarity. However the discussion concerning the wrist wear 110 in connection with FIG. 1 applies also to the discussion of the system 100 in relation to FIG. 2.

The impedance measurement circuit 130 is adapted to measure an impedance in a plurality of portions of the wrist 160 via a respective electrode group, each electrode group including four skin electrodes of the set of skin electrodes 120.

The impedance measurement circuit 130 is selectively connectable to an electrode group via a switching circuit 132 of the system 100. The switching circuit 132 is adapted to selectively connect the impedance measurement circuit 130 to one of the electrode groups of the set of skin electrodes 120. The impedance measurement circuit 130 is adapted to measure an impedance via the electrode group to which the impedance measurement circuit 130 is currently connected. The switching circuit 132 may thereby control which impedance measurement channel should be used at each instant. Although illustrated as a separate block in relation to the block 130, the switching circuit 132 may also form part of the impedance measurement circuit 132.

The switching circuit 132 may include a set of switches, such as relays or transistor-based switches. One switch may be connected to each electrode of the set of skin electrodes 120. The impedance measurement circuit 130 may include four terminals. Each terminal of the impedance measurement circuit 130 may be connected to one electrode of each electrode group via a respective switch of the switching circuit 132. The state of the switches (e.g. "open" or "close") may be controlled by a control circuit of the switching circuit 132, adapted to output control signals for selectively switching the state of the set of switches to connect the impedance measurement circuit 130 to the intended electrode group. The four terminals of the impedance measurement circuit 130 may thus be connected to four electrodes of each electrode group by controlling the states of the switches. This implementation of the switching circuit 132 however only represents one way of achieving the desired function and various other implementations of the switching circuit 132 are possible. An analog multiplexer may for instance be used for selecting the active electrode group for the impedance measurement circuit 130.

Referring to the four electrodes of an electrode group of the set of skin electrodes 120 as a first, a second, a third and a fourth electrode, respectively, the impedance measurement circuit 130 may be adapted to measure an impedance via an electrode group by transmitting a test current between the first and the second electrode of the electrode group and, while the test current propagates through a portion of the wrist 160, measuring a voltage between the third and the fourth electrodes of the electrode group. With reference to the above example implementation of the switching circuit 132, the test current may be transmitted from the first terminal to the second terminal (via the first and the second skin electrode) and the voltage may be measured between the third and the fourth terminal of the impedance measurement circuit 130 (via the third and the fourth skin electrode).

A test current may be generated by a signal generator of the impedance measurement circuit 130 including a controlled current source adapted to output an AC test current of a predetermined amplitude and frequency via the first and second terminals of the impedance measurement circuit 130. The amplitude of the test current may for example be in the range of 10 µA to 1 mA. The frequency of the test current may for example be in the range of 1 kHz to 1 MHz. The test signal may be generated at a single predetermined frequency or within a relatively narrow frequency band, however broadband frequency generation is also possible.

The test current may be transmitted between the first electrode and the second electrode of the currently selected electrode group, as controlled by the switching circuit 132. The voltage induced in a wrist portion conducting the test current may be measured via the third and the fourth skin electrode of the currently selected electrode group. The absolute value of the body impedance of the wrist portion may be estimated from the ratio between the amplitude of the measured voltage and the amplitude of the test current. A phase of the body impedance may be estimated from a phase difference between the test current and the measured voltage. The impedance measurement circuit 130 may include an analog-to-digital converter for sampling and digitizing the test current transmitted between the first and the second electrode and the resulting voltage between the third and the fourth electrode. The impedance measurement circuit 130 may thus calculate the absolute value of the body impedance and the phase of the body impedance in a digital domain.

The switching circuit 132 may be adapted to connect the impedance measurement circuit 130 to only one electrode group at a time. An active impedance measurement channel may thus be changed in a "time-division manner" wherein the impedance measurements circuit 130 may measure an impedance in only one portion of the wrist 160 at a time. The switching circuit 132 may be adapted to repeatedly cycle through all available impedance measurement channels of the system 100. The switching circuit 132 may be adapted to change the active impedance measurement channel at a predetermined rate such as 10-500 times per second. Each time an impedance measurement channel is changed the impedance measurement circuit 130 may be adapted to perform an impedance measurement via the electrode group representing the currently active impedance measurement channel. The time interval during which the impedance measurement circuit 130 may measure an impedance in a wrist portion depends on inter alia the rate at which the switching circuit 132 cycles through the impedance measurement channels and the frequency of the test signal. The impedance measurement circuit 130 may be adapted to determine a mean or median value of the impedance measured during the time interval as the result of the impedance measurement.

As an alternative to the single impedance measurement circuit 130 and the switching circuit 132, the system 100 may include a separate impedance measurement circuit associated with and connected to each electrode group of the set of skin electrodes 120. Each such impedance measurement circuit may accordingly measure an impedance via its associated electrode group independently from the other impedance measurement circuits (e.g. repeatedly at a predetermined rate). Each impedance measurement circuit may otherwise operate in a manner corresponding to the impedance measurement circuit 130.

With reference to FIG. 2, the processing circuit 140 is connected to the impedance measurement circuit 130. The impedance measurement circuit 130 may be adapted to provide to the processing circuit 140 an output signal which includes a representation of the measured impedance. The representation may for instance be a value of the measured impedance. The output signal may further include an indication of the electrode group via which the impedance is measured.

Alternatively, the impedance measurement circuit 130 may be adapted to store a representation of a measured impedance in a data memory (not shown in FIG. 2) of the system 100. The processing circuit 140 may be adapted to read the impedance measurement from the data memory. The data memory may include a data structure including a respective storage area associated with each impedance measurement channel. The impedance measurement circuit 130 may accordingly be adapted to store a representation of a measured impedance in a storage area of the data structure which is associated with the impedance measurement channel via which the impedance was measured. The relevant storage area of the data structure may hence be updated each time a new impedance measurement has been performed. At each instance, the processing circuit 140 may thereby gain access to the set or combination of the most recently measured impedances for each respective impedance measurement channel.

A set or combination of values representing the most recently measured impedance for each impedance measurement channel, or the magnitude of the change of the measured impedance for each impedance measurement channel may in the following be referred to as the current set of measured impedances.

The processing circuit 140 is adapted to detect a hand gesture of the user based on impedances measured by the impedance measurement circuit 130. The processing circuit 140 may be adapted to detect a hand gesture on the basis of a changed impedance for one or more electrode groups of the set of skin electrodes 120, i.e. in one or more wrist portions. Such an analysis may be performed repeatedly at a predetermined rate or each time a new impedance measurement is performed.

The processing circuit 140 may be adapted to determine if an impedance measured via an electrode group is changed in relation to a previous impedance measured via the electrode group by more than some predetermined threshold (in amplitude and/or phase domain, the values of which may be set based on a desired sensitivity level of the detection). If the determination is positive, the processing circuit 140 may determine that a hand gesture (e.g. a finger movement) was made. In response to the positive determination the processing circuit 140 may provide an output signal indicating that a movement was detected for the electrode group, i.e. the impedance measurement channel, which measured the change (e.g. "channel 1","channel 2", . . . or channel "n"). In the event that a positive determination is made in relation to more than one impedance measurement channel, the processing circuit 140 may provide an output signal indicating that a movement was detected for the more than one impedance measurement channels.

The processing circuit 140 may implement a classification function adapted to map the current set of measured impedances to one of a plurality of predefined gesture types. The classification function may be performed repeatedly at a predetermined rate or each time a new impedance measurement is performed (wherein a new current set of measured impedances becomes available).

Non-limiting example of predefined gesture types include basic gesture types such as "movement of the thumb", "movement of the index finger", "movement of the middle finger" etc; and more elaborate gesture types such as "extension of the thumb", "bending of the thumb", "extension of the index finger", "bending of the index finger" etc, and combinations thereof.

The classification function may for example map the current set of measured impedances to a predefined gesture type by comparing the current set of measured impedances with a set of vectors including a same number of components as the number of impedance measurement channels, each component having a predefined value and each vector being associated with a particular gesture type. The classification function may map the current set of measured impedances of impedance measurements to the gesture type which is associated with the vector which is closest to the given combination of impedance measurements, using some appropriate norm. The classification function may also employ other mathematical methods for mapping a current combination of impedance measurements to a predefined gesture type, such as fuzzy logic, linear and/or multiple linear regression models, random forest regression models, Bayesian models and/or general machine learning regression models machine learning.

The processing circuit 140 may provide an output signal indicating the result of the classification function which may be a human-readable label of the predefined gesture type which the classification function mapped to or some other type of identification or label which may be interpreted by a remote device which is to be controlled on the basis of the detected gesture.

The system 100 includes an input/output (I/O) interface 142. The processing circuit 140 is connected to the I/O interface 142. The I/O interface 142 is adapted to receive the output signal from the processing circuit 140. The output signal from the processing unit 140 may, as described above, indicate that a gesture was detected and/or for which impedance measurement channels movement was detected. If the processing circuit 140 implements the classification function described above the output signal may alternatively or additionally indicate the gesture type.

The I/O interface 142 may include a wireless transceiver wherein a representation of the output signal from the measurement circuit 130 may be forwarded to a remote device, e.g. in the form of a data packet. The I/O interface 142 may for example implement wireless communication using a state-of-the-art wireless communications technology such as BLUETOOTH®, BLUETOOTH® LE or WiFi. The I/O interface 142 may alternatively be adapted to implement Human Body Communication (if the remote device is carried by the user). In any case the I/O interface 142 may be powered by a same power source as the processing circuit 140. Although illustrated as a separate block in relation to the block 140, the I/O interface 142 may also form part of the processing circuit 140.

The remote device may for example be a computing device such as a smart phone, a tablet computer, a hybrid of a laptop and tablet computer, a TV, a gaming console etc. The remote device may implement a mapping function adapted to map a content of the received signal to a one of a plurality of predefined commands or actions which are defined in relation to the user interface and/or operating system running on the computing device. Such commands or action may as a non-limiting example include emulation of a mouse click, emulation of a particular keyboard input, movement of a pointer or shifting of focus within a graphical user interface, launching or termination of a software application executable on the remote device, etc.

As an alternative to the processing circuit 140 being arranged on the wrist wear 110 or in a separated electronics module wired to the wrist wear, the processing circuit 140 (with the above described functionality) may instead be formed by a processing circuit of the remote device. Thereby, possibly power consuming computing operations may be alleviated from the electronics of the wrist wear 110. In that case, the I/O interface 142 may instead be connected directly to the impedance measurement circuit 130 wherein the I/O interface 142 may communicate results of impedance measurements performed by the impedance measurement circuit 130 to the processing device of the remote device.

As illustrated in FIG. 2, the system 100 may optionally further include an accelerometer 150. The accelerometer 150 may be arranged on the wrist wear 110. The system 100 may thereby detect movement of also the arm of the user. An output signal indicative of detected movement by accelerometer may be output to the processing circuit 140. The input from the accelerometer 150 may be used in conjunction with the measured impedances wherein combinations of hand gestures and arm movements may be detected and provided to the remote device for control thereof.

Figure 3A:
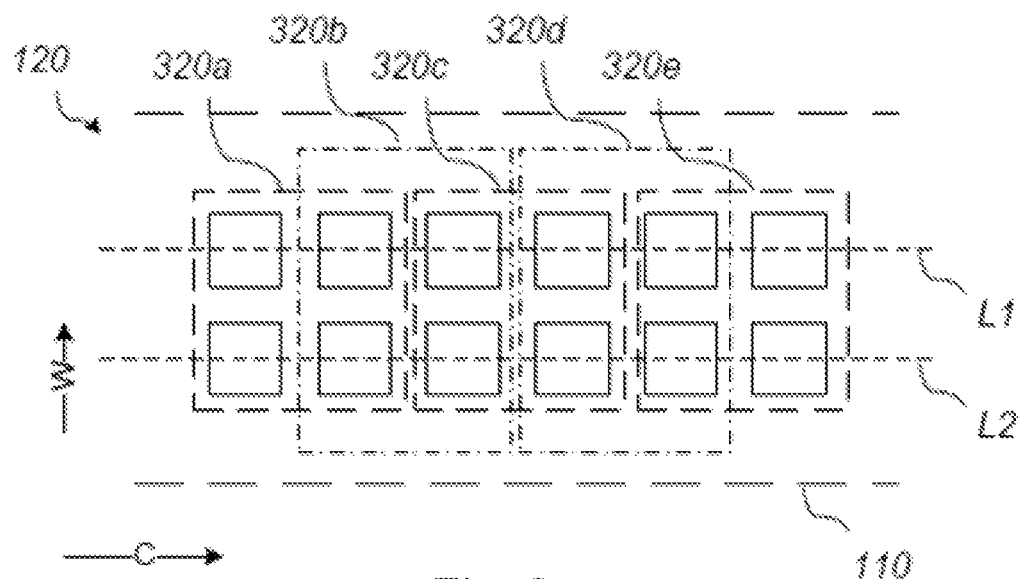
FIGS. 3a and 3b illustrate an arrangement of a set of electrodes according to an example embodiment.
Figure 3B:
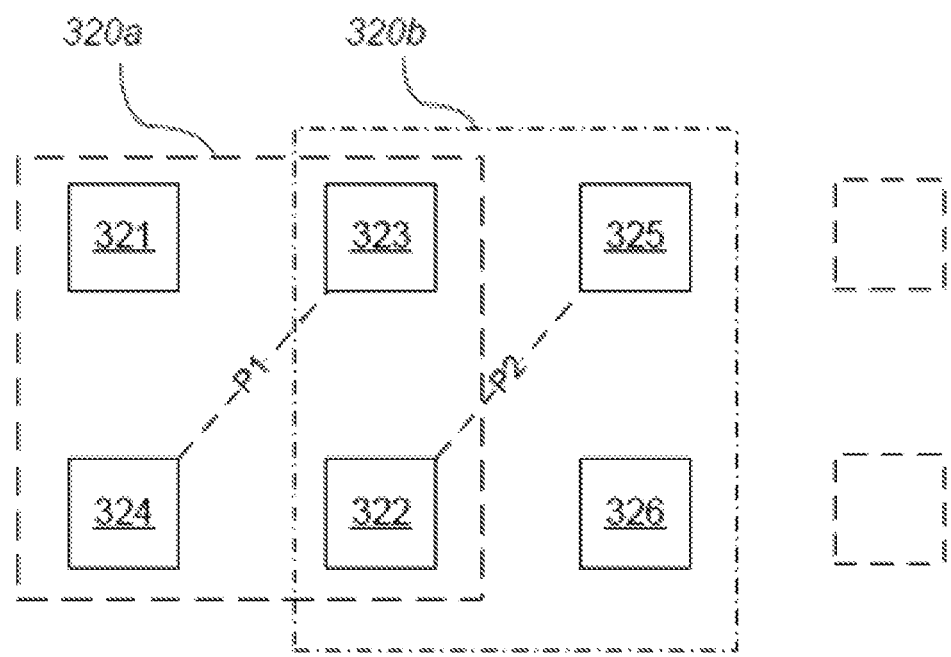

FIGS. 3a and 3b schematically illustrate an arrangement of the set of electrodes 120 of the wrist wear 110. FIG. 3a illustrates the side of the wrist wear 110 which is intended to face the skin of the wrist. The circumferentially extending edges of the wrist wear 110 are schematically indicated by the pair of outer dashed lines. The direction denoted "C" indicates the circumferential direction or dimension of the wrist wear 110. The direction denoted "W" indicates the width direction or dimension of the wrist wear 110. The electrodes of the set of electrodes 120, the electrode separation as well as the wrist wear 110 are not drawn to scale in FIGS. 3a and 3b. For instance each electrode may cover a smaller surface area of the wrist wear 110 than shown in FIG. 3a and the electrode separations may be greater or smaller than indicated.

The set of electrodes 120 includes a first row of electrodes which are aligned along a first geometrical line L1 and a second row of electrodes which are aligned along a second geometrical line L2. The first and the second rows of electrodes are displaced in relation to each other along the direction W. Either one of the first and second row may be arranged closer to the hand than the other one.

In FIG. 3a, the first geometrical line L1 and the second geometrical line L2 are parallel to each other and also parallel to the circumferential direction C. This arrangement enables a uniform appearance of the set of electrodes 120 and may enable rational manufacturing and reduce spatial variations between the electrode groups and consequently reduce undesired biasing of impedance measurements between the different electrode groups 320a-e.

Alternatively, one or both of the first and the second geometrical lines L1, L2 may however extend at an angle (i.e. in a non-parallel direction) in relation to the circumferential direction C. The electrodes of the set of electrodes 120 may thereby present varying distances from the edges of the wrist wear 110.

Each row includes six separate electrodes. This enables formation of five electrode groups 320a-e, each including four electrodes. The electrode groups 320a-e are displaced in relation to each other along the direction C of the wrist wear 110.

FIG. 3b shows an enlarged view of a first electrode group 320a and a second electrode group 320b of the set of electrodes 120, wherein:

the electrode 321 forms a first electrode of the electrode group 320a, the electrode 322 forms a second electrode of the electrode group 320a, the electrode 323 forms a third electrode of the electrode group 320a, the electrode 324 forms a fourth electrode of the electrode group 320a, the electrode 323 forms a first electrode of the electrode group 320b, the electrode 326 forms a second electrode of the electrode group 320b, the electrode 325 forms a third electrode of the electrode group 320b, and the electrode 322 forms a fourth electrode of the electrode group 320b.

Accordingly, the first electrode group 320a and the second electrode group 320b are defined to have the two electrodes 322 and 323 in common. The two electrodes 322 and 323 are arranged between the electrodes 321, 324 and 325, 326, as viewed along the direction C.

As shown in FIG. 3b, in each one of the first and the second electrode groups 320a and 320b, the first and the second electrode (321 and 322, or 323 and 326) are arranged on opposite sides of a straight geometrical line (P1 or P2) extending between the third and the fourth electrode (323 and 324; or 325 and 322).

The impedance measurement circuit 130 may be adapted to measure an impedance via the electrode group 320a by transmitting the test current between the electrode 321 and the electrode 322 and measure a voltage between the electrode 323 and the electrode 324. The impedance measured via the electrode group 320a may hence be estimated in a portion of the wrist extending along the geometrical line P1 which extends across the direction along which the test current is transmitted.

The impedance measurement circuit 130 may be adapted to measure an impedance via the electrode group 320b by transmitting the test current between the electrode 323 and the electrode 326 and measure a voltage between the electrode 325 and the electrode 322. The impedance measured via the electrode group 320b may hence be estimated in a portion of the wrist extending along the geometrical line P2 which extends across the direction along which the test current is transmitted.

Accordingly, the electrode 323 may be used for voltage sensing in the electrode group 320a and for transmitting the test current in the electrode group 320b. Conversely, the electrode 322 may be used for transmitting the test current in the electrode group 320a and for voltage sensing in the electrode group 320b.

Alternatively, the impedance measurement circuit 130 may be adapted to measure the impedance via the electrode group 320b by transmitting the test current between the electrode 325 and the electrode 322 and measure a voltage between the electrode 323 and the electrode 326. According to this alternative, the electrode 323 is used for voltage sensing in both of the electrode groups 320a and 320b. Conversely, the electrode 322 is used for transmitting a test current in both the electrode group 320a and 320b.

Although in the above reference was made mainly to the electrode groups 320a and 320b, the above discussion applies correspondingly to each adjacent pair of electrode groups, i.e. 320b-320c; 320c-320d; 320d-320e.

Figure 4A:
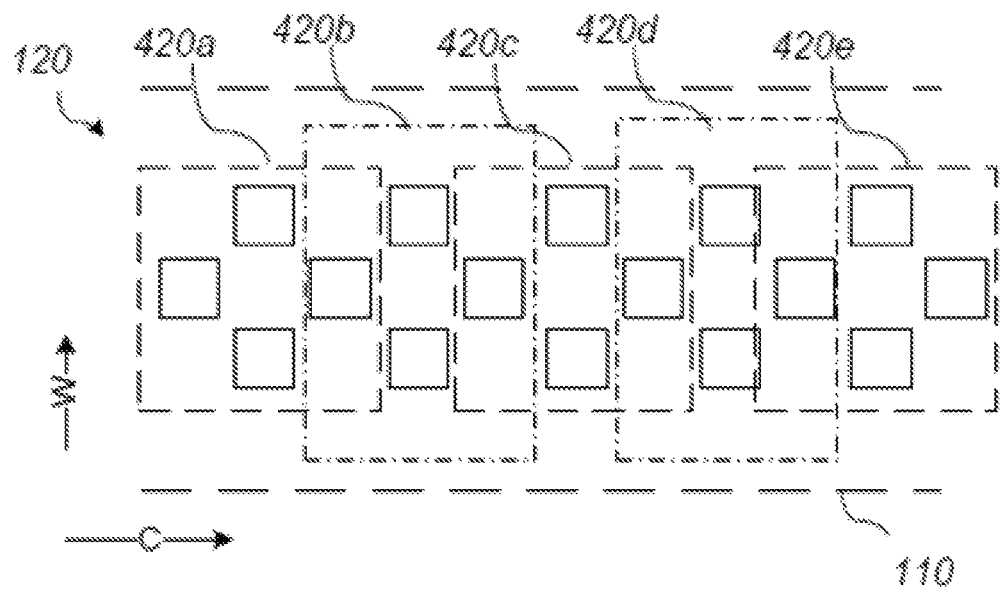
FIGS. 4a and 4b illustrate an arrangement of a set of electrodes according to an example embodiment.
Figure 4B:
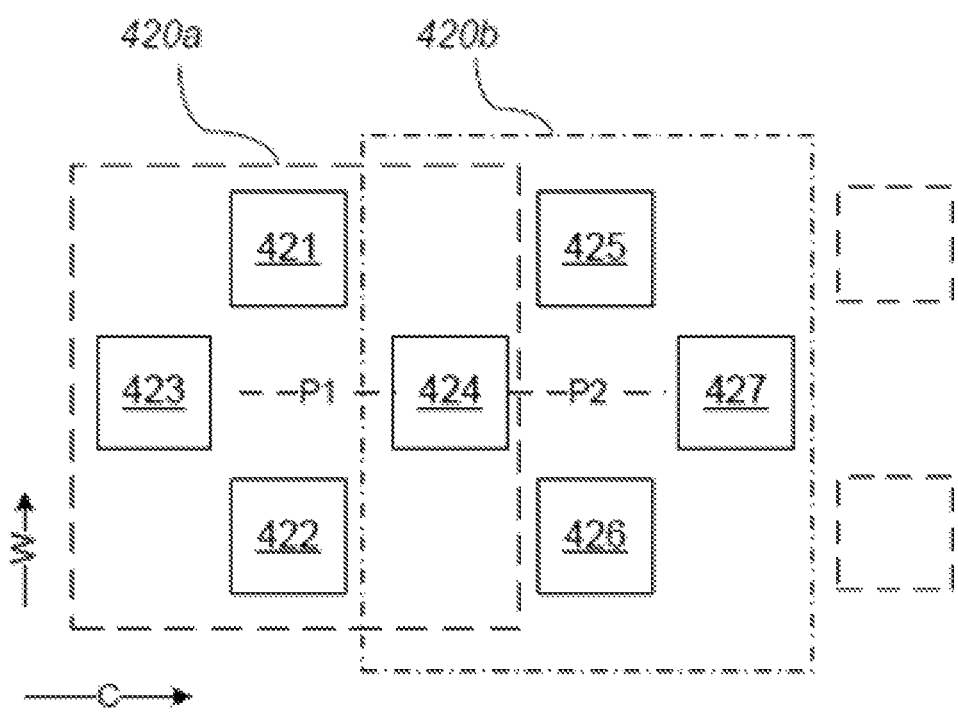

FIGS. 4a and 4b schematically illustrate a further arrangement of the set of electrodes 120 of the wrist wear 110. The views in FIGS. 4a and 4b generally correspond to the views in FIGS. 3a and 3b.

The set of electrodes 120 includes a first, a second and a third row of electrodes which are aligned along a respective geometrical line (not shown for illustrative clarity). The first, the second and the third rows of electrodes are displaced in relation to each other along the direction W. Either one of the first and third row may be arranged closer to the hand than the other one.

The first and the third row of electrodes (i.e. the outer rows of electrodes) include five electrodes each. The second row (i.e. the middle row of electrodes) includes six electrodes. This enables formation of five electrode groups 420a-e, each including four electrodes. The electrode groups 420a-e are displaced in relation to each other along the direction C of the wrist wear.

FIG. 4b shows an enlarged view of a first electrode group 420a and a second electrode group 420b of the set of electrodes 120, wherein:

the electrode 421 forms a first electrode of the electrode group 420a, the electrode 422 forms a second electrode of the electrode group 420a, the electrode 423 forms a third electrode of the electrode group 420a, the electrode 424 forms a fourth electrode of the electrode group 420a, the electrode 425 forms a first electrode of the electrode group 420b, the electrode 426 forms a second electrode of the electrode group 420b, the electrode 424 forms a third electrode of the electrode group 420b, and the electrode 427 forms a fourth electrode of the electrode group 420b.

Accordingly, the first electrode group 420a and the second electrode group 420b are defined to have the one electrode 424 in common. The electrode 424 is arranged between the electrodes 421-423 and 425-427 as viewed along the direction C.

As shown in FIG. 4b, in each one of the first and the second electrode groups 420a and 420b, the first and the second electrode (421 and 422, or 425 and 426) are arranged on opposite sides of a straight geometrical line (P1 or P2) extending between the third and the fourth electrode (423 and 424; or 424 and 427).

Similar to the discussion in connection with FIG. 3b, the impedance measurement circuit 130 may be adapted to measure an impedance via the electrode group 420a by transmitting the test current between the electrode 421 and the electrode 422 and measure a voltage between the electrode 423 and the electrode 424 (or vice versa). The impedance measured via the electrode group 420a may hence be estimated in a portion of the wrist extending along (or across) the geometrical line P1.

The impedance measurement circuit 130 may be adapted to measure an impedance via the electrode group 420b by transmitting the test current between the electrode 425 and the electrode 426 and measure a voltage between the electrode 424 and the electrode 427. The impedance measured via the electrode group 420b may hence be estimated in a portion of the wrist extending along (or across) the geometrical line P2.

Although in the above reference was made mainly to the electrode groups 420a and 420b, the above discussion applies correspondingly to each adjacent pair of electrode groups, i.e. 420b-420c; 420c-420d; 420d-420e.

Figure 5A:
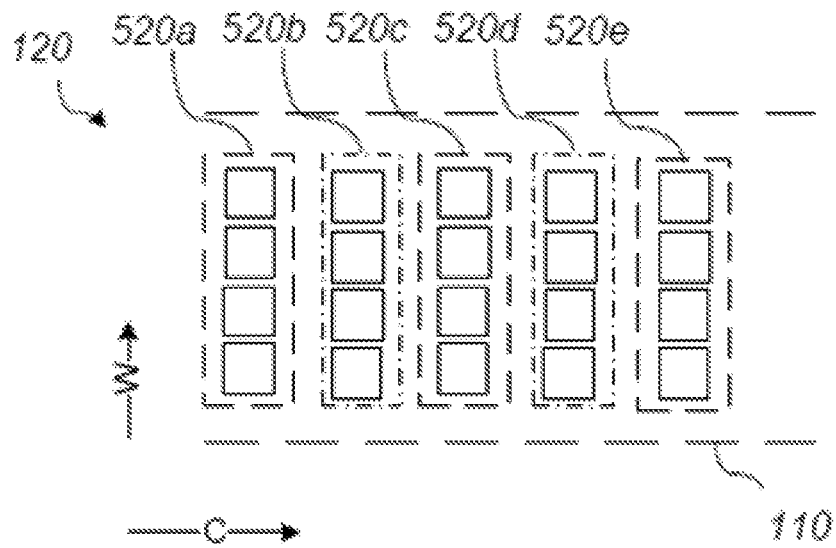
FIGS. 5a and 5b illustrate an arrangement of a set of electrodes according to an example embodiment.
Figure 5B:
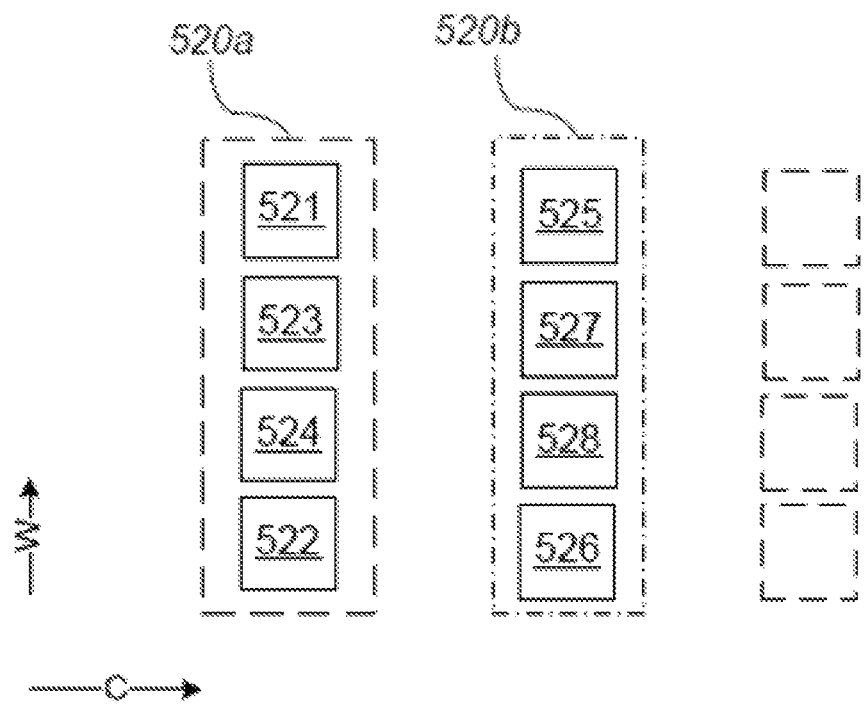

FIGS. 5a and 5b schematically illustrate a further arrangement of the set of electrodes 120 of the wrist wear 110. The views in FIGS. 5a and 5b generally correspond to the views in FIGS. 3a and 3b.

The set of electrodes 120 includes five columns of four electrodes each, which are aligned along a respective geometrical line (not shown for illustrative clarity). The columns are circumferentially displaced in relation to each other. This enables formation of five electrode groups 520a-e, each including four electrodes. The electrode groups 520a-e are displaced in relation to each other along the direction C of the wrist wear.

In FIG. 5a, the columns (i.e. the electrodes of each electrode group 520a-e) are aligned along parallel geometrical lines, which also are parallel to the width direction W of the wrist wear 110. This arrangement enables a uniform appearance of the set of electrodes 120 and may enable rational manufacturing and reduce spatial variations between the electrode groups and consequently reduce undesired biasing of impedance measurements between the different electrode groups 520a-e.

Alternatively, one or more of the columns may be aligned along a respective geometrical line which is angled or inclined in relation to the width direction W. This may facilitate measuring an impedance across a tendon.

FIG. 5b shows an enlarged view of a first electrode group 520a and a second electrode group 520b of the set of electrodes 120, wherein:

the electrode 521 forms a first electrode of the electrode group 520a, the electrode 522 forms a second electrode of the electrode group 520a, the electrode 523 forms a third electrode of the electrode group 520a, the electrode 524 forms a fourth electrode of the electrode group 520a, the electrode 525 forms a first electrode of the electrode group 520b, the electrode 526 forms a second electrode of the electrode group 520b, the electrode 527 forms a third electrode of the electrode group 520b, and the electrode 528 forms a fourth electrode of the electrode group 520b.

Accordingly, the third and the fourth electrode of each electrode group are arranged between the first and the second electrode of the respective electrode group, as viewed along the direction W.

The impedance measurement circuit 130 may be adapted to measure an impedance via the electrode group 520a by transmitting the test current between the electrode 521 and the electrode 522 and measure a voltage between the electrode 523 and the electrode 524.

The impedance measurement circuit 130 may be adapted to measure an impedance via the electrode group 520b by transmitting the test current between the electrode 525 and the electrode 526 and measure a voltage between the electrode 527 and the electrode 528.

The voltage may hence be measured along a same path as the test current is transmitted along for both electrode groups 520a, 520b.

The electrode groups 520a, 520b enable impedances to be measured along a direction which corresponds substantially to a length direction of the tendons in the wrist. The sensitivity to impedance variations due to tendon stretching/contraction may thus be increased Although in the above reference was made mainly to the electrode groups 520a and 520b, the above discussion applies correspondingly to the further electrode groups 520c-e.

In the above the present disclosure has mainly been described with reference to a limited number of examples. However, as is readily appreciated by a person skilled in the art, other examples than the ones disclosed above are equally possible within the scope of the present disclosure, as defined by the appended claims.

For instance, although the set of electrodes 120 in FIGS. 3-5 include five electrode groups, it is possible to include a smaller or a greater number of electrode groups in the set of electrodes, depending on the desired degree of spatial resolution of the impedance measurements.

Furthermore, although in each of FIGS. 3a-5b the electrodes of the set of electrodes 120 are shown to have a same appearance the electrodes of the set of electrodes 120 may in fact have different appearances. For instance the electrodes of the set of electrodes 120 may present different surface areas. The electrodes of the set of electrodes 120 may also be provided in other shapes than the illustrated square-shape and may for instance have rectangular shapes, triangular shapes, polygonal shapes or even rounded shapes such as circular or oval shapes.

Moreover, in FIGS. 3a and 3b, each adjacent pair of electrode groups have two electrodes in common. Alternatively, a similar arrangement of the electrodes of the set of electrodes 120 may be used but wherein adjacent pairs of electrode groups have no electrodes in common. According to this alternative the first row of electrodes and the second row of electrodes may each include ten electrodes, in order to accommodate for five distinct electrode groups.

Likewise, in FIGS. 4a and 4b, each adjacent pair of electrode groups has one electrode in common. Alternatively, a similar arrangement of the electrodes of the set of electrodes 120 may be used but wherein adjacent pairs of electrode groups have no electrodes in common. According to this alternative the first row of electrodes and the third row of electrodes may each include five electrodes and the second row of electrodes may include ten electrodes, in order to accommodate for five distinct electrode groups.

Although forming the electrode groups to not have any electrodes in common requires a greater number of electrodes for defining a same number of electrode groups as the arrangement shown in FIG. 4a, it provides an increased freedom in terms of the relative positioning of the electrode groups. For instance, the electrode groups may be displaced in relation to each other along the width direction W. Each electrode group may thereby be provided at the position along a respective tendon which represents the best impedance measurement position.

According to a further alternative the system 100 may include an additional wrist wear of a same type as the wrist wear 110. The wrist wear 110 may be worn about one wrist and the additional wrist wear may be worn about the other wrist. The system 100 may thereby enable gesture detection for two hands.

The invention claimed is:

1. A system for hand gesture detection, comprising:
   a wrist wear adapted to be worn about a wrist of a user and including a set of skin electrodes;
   an impedance measurement circuit adapted to measure at least a first impedance in a first portion of the wrist and a second impedance in a second portion of the wrist, wherein the second portion is circumferentially displaced in relation to the first portion, and wherein the first impedance is a first tetra-polar impedance measurement measured via a first electrode group including four skin electrodes of the set of skin electrodes and the second impedance is a second tetra-polar impedance measurement measured via a second electrode group including four skin electrodes of the set of skin electrodes, and
   a processing circuit adapted to detect a hand gesture of the user based on the first and the second impedance measured by the impedance measurement circuit.

2. The system according to claim 1, wherein the first electrode group and the second electrode group have at least one electrode in common.

3. The system according to claim 1, wherein, for each one of the first and the second electrode groups, a first and a second electrode of the respective electrode group are arranged on opposite sides of a geometrical line extending between a third and a fourth electrode of the respective electrode group.

4. The system according to claim 3, wherein the first electrode group and the second electrode group have at least one electrode in common, and wherein the at least one common electrode is arranged between the other electrodes of the first electrode group and the other electrodes of the second electrode group, as viewed along a circumferential direction of the wrist wear.

5. The system according to claim 3, wherein the second electrode of the first electrode group forms the fourth electrode of the second electrode group and the third electrode of the first electrode group forms the first electrode of the second electrode group, and wherein the second and the third electrode of the first electrode group are arranged between the first and fourth electrodes of the first electrode group and the second and third electrodes of the second electrode group, as viewed along a circumferential direction of the wrist wear.

6. The system according to claim 3, wherein the first and the third electrode of the first electrode group and the second electrode group are arranged along a first common geometrical line and wherein the fourth and the second electrode of the first electrode group and the second electrode group are arranged along a second common geometrical line.

7. The system according to claim 3, wherein the fourth electrode of the first electrode group forms the third electrode of the second electrode group, the fourth electrode of the first electrode group being arranged between the other three electrodes of the first electrode group and the other three electrodes of the second electrode group, as viewed along a circumferential direction of the wrist wear.

8. The system according to claim 1, wherein the first and the second electrode group are circumferentially displaced in relation to each other and wherein, for each one of the first and the second electrode group, a first, a second, a third and a fourth electrode of the electrode group are arranged along a common geometrical line, the third and the fourth electrode being arranged between the first and the second electrode.

9. The system according to claim 1, wherein:
   a first and a second electrode of the first electrode group forms a first electrode pair of the first electrode group, a third and a fourth electrode of the first electrode group forms a second electrode pair of the first electrode group, a first and a second electrode of the second electrode group forms a first electrode pair of the second electrode group, a third and a fourth electrode of the second electrode group forms a second electrode pair of the second electrode group, and
   the impedance measurement circuit is adapted to:
   measure the first impedance, wherein measuring the first impedance includes transmitting a first test current between one of the first and the second electrode pair of the first electrode group and measuring a first voltage between the other one of the first and the second electrode pair of the first electrode group, and
   measure the second impedance, wherein measuring the second impedance includes transmitting a second test current between one of the first and the second electrode pair of the second electrode group and measuring a second voltage between the other one of the first and the second electrode pair of the second electrode group.

10. The system according to claim 9, wherein the second electrode of the first electrode group forms the fourth electrode of the second electrode group and the third electrode of the first electrode group forms the first electrode of the second electrode group, and wherein the measurement circuit is adapted to transmit the first test current between the first electrode pair of the first electrode group and measure the first voltage between the second electrode pair of the first electrode group, and to transmit the second test current between the second electrode pair of the second electrode group and measure the second voltage between the first electrode pair of the second electrode group.

11. The system according to claim 1, wherein the set of electrodes includes at least five electrode groups circumferentially displaced in relation to each other, and wherein each electrode group includes four electrodes.

12. The system according to claim 1, wherein the electrodes of the set of skin electrodes are distributed in relation to each other along a circumferential section of the wrist wear which is adapted to face an under side of the wrist of the user.

13. The system according to claim 1, further comprising a switching circuit adapted to selectively connect the measurement circuit to the first electrode group or the second electrode group.

14. The system according to claim 1, wherein the processing circuit is adapted to detect a hand gesture by detecting a changed impedance in the first or the second portion of the wrist based on the first and the second impedance, respectively.

15. The system according to claim 1, wherein the impedance measurement circuit is adapted to measure an impedance in each one of a plurality of circumferentially displaced portions of the wrist via a respective electrode group including four skin electrodes, and wherein the processing circuit is adapted to detect and classify the hand gesture based on the impedance measured in each one of the plurality of circumferentially displaced portions.

16. The system according to claim 1, further comprising an accelerometer adapted to measure a movement of an arm of the user.

17. The system of claim 16, wherein the accelerometer is further adapted to output a signal indicative of detected movement by the accelerometer to the processing circuit.

18. The system of claim 17, wherein the processing circuit is further adapted to detect a hand gesture of the user based on the signal indicative of detected movement.

* * * * *